(12) United States Patent
Tessier

(10) Patent No.: US 6,250,017 B1
(45) Date of Patent: Jun. 26, 2001

(54) SLIDEWAY FOR A MOTOR VEHICLE DOOR AND METHOD FOR FITTING IT PARTICULARLY BY DIFFERENTIAL BENDING

(75) Inventor: Bernard Tessier, Chalette Sur Loing (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/388,335

(22) Filed: Sep. 1, 1999

(30) Foreign Application Priority Data

Sep. 3, 1998 (FR) .................................................. 98 11033

(51) Int. Cl.$^7$ .................................................. E05D 15/16
(52) U.S. Cl. ............................................ 49/440; 49/489.1
(58) Field of Search ..................................... 49/440, 489.1, 49/490.1, 502, 441; 296/146.2, 146.5

(56) References Cited

U.S. PATENT DOCUMENTS

| | | | |
|---|---|---|---|
| 4,783,931 | * 11/1988 | Kirkwood | 49/441 |
| 4,843,763 | * 7/1989 | Mesnel | 49/440 |
| 4,908,989 | 3/1990 | Omura . | |
| 4,951,418 | * 8/1990 | Keys | 49/440 |
| 5,010,689 | * 4/1991 | Vaughan | 49/440 |
| 5,014,464 | * 5/1991 | Dupuy et al. | 49/440 |
| 5,095,656 | * 3/1992 | Keys | 49/441 |
| 5,168,668 | * 12/1992 | Mishima et al. | 49/440 |
| 5,226,258 | * 7/1993 | Mesnel et al. | 49/490.1 |
| 5,475,947 | * 12/1995 | Dupuy | 49/490.1 |
| 5,557,890 | 9/1996 | Levy . | |
| 5,628,150 | * 5/1997 | Mesnel | 49/440 |

FOREIGN PATENT DOCUMENTS

| | | |
|---|---|---|
| 0 267 073 | 5/1988 | (EP) . |
| WO 98 35847 | 8/1998 | (WO) . |

* cited by examiner

Primary Examiner—Daniel P. Stodola
Assistant Examiner—Curtis A. Cohen
(74) Attorney, Agent, or Firm—Alston & Bird LLP

(57) ABSTRACT

A method is provided for fitting a slideway, particularly a reinforced slideway, to a door of a motor vehicle exhibiting a doorframe, as well as a fixed glass and a moving glass which are separated by a fixed post. The method involves:

longitudinally separating the slideway, over part of its length, into an outer portion (3) which exhibits at least an outer wall region (12), and an inner portion (2) which exhibits at least a mounting region (10) and a sealing lip (25) borne by a common wall (21), so that the slideway exhibits an unseparated region in which it consists of a main portion (1) and, from a point (100) of separation onward, a separated region in which the main portion is split along a longitudinal cutting line to form the inner portion (2) and the outer portion (3);

mounting the main portion (1) on the doorframe (75, 76) up to the point where the point (100) of separation comes into line with the post (40);

mounting the outer portion (3) and the inner portion (2) on the doorframe (77) beyond said point (100) of separation, and the inner portion (2) along the post (40), respectively.

13 Claims, 3 Drawing Sheets

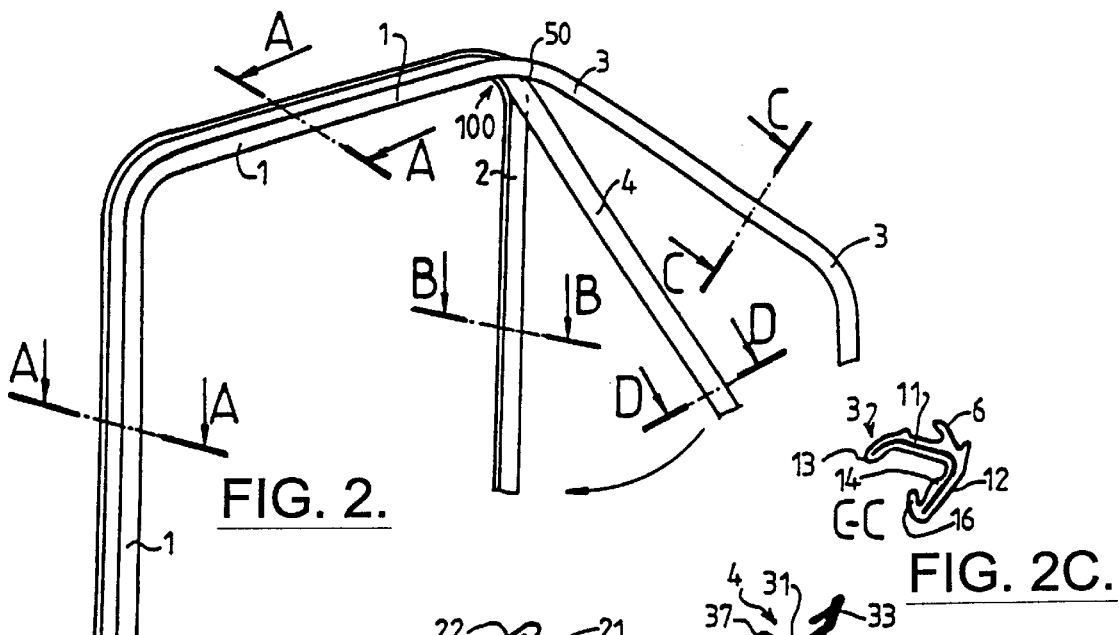
FIG. 2.
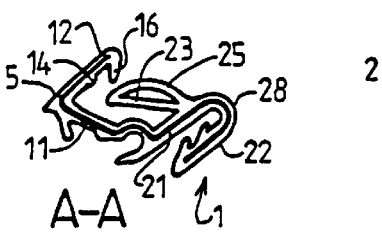
FIG. 2A.
FIG. 2B.
FIG. 2C.
FIG. 2D.
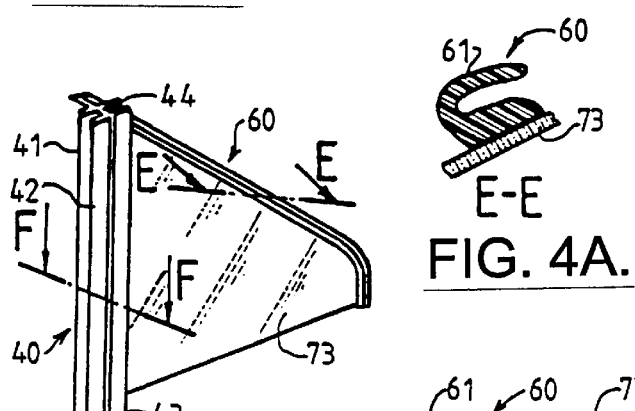
FIG. 4.
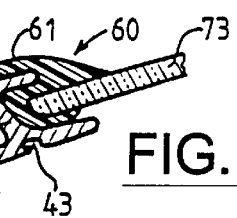
FIG. 4A.
FIG. 4B.

SLIDEWAY FOR A MOTOR VEHICLE DOOR AND METHOD FOR FITTING IT PARTICULARLY BY DIFFERENTIAL BENDING

The subject of the present invention is a slideway, particularly a reinforced slideway for a motor vehicle door, and the method for fitting it.

The invention relates, in particular, to slideways made of EPDM or TPE, preferably comprising a reinforcement, particularly to slideways which, for motor vehicle architecture or style reasons must seal both a moving drop glass, side by side with a fixed glass (generally triangular and known as a quarter light), the two glasses (mobile and fixed) being separated by a U- or H-shaped upright, known as a fixed glass upright or post.

When a moving glass needs to be associated with a fixed quarter light, it is very tricky both to provide esthetic continuity on the outside of the vehicle and acoustic continuity on the inside of the vehicle.

Specifically, there are two main scenarios encountered:
in the first scenario, the slideway runs in parallel along the crimped doorframe (the case, for example, of the front door of the Renault Scenic automobile) and the joint at the top of the post is not very esthetic from outside the vehicle, because the strip which covers the post reaches the top practically edge to edge with the slideway, but what is more, acoustic sealing inside the vehicle in the upper region of the post is not easy to ensure, because of the discontinuity of the pressing lips.
in the second scenario, the slideway turns at the top of the post and runs down along it, and the fixed glass is then sealed by an independent rubber component which is either driven in or overmolded. This solution is acoustically acceptable, but is becoming ever less tolerated from the esthetic point of view.

The object of the present invention is to at least partially overcome the above drawbacks.

The basic idea underlying the invention is to achieve this by locally dissociating the acoustic and esthetic functions in order to allow the desired result to be obtained.

The invention thus relates to a method for fitting a slideway, particularly a reinforced slideway, to a door of a motor vehicle exhibiting a doorframe, as well as a fixed glass and a moving glass which are separated by a fixed post, said slideway exhibiting a region for mounting on a support such as a rebate and a sealing region comprising at least two opposed sealing lips, the mounting region and the sealing region exhibiting a common wall region which bears at least one said sealing lip, and the sealing region exhibiting an outer wall region forming outer covering of the slideway, characterized in that it involves:
longitudinally separating the slideway, over part of its length, into an outer portion which exhibits at least said outer wall region, and an inner portion which exhibits at least said mounting region and said sealing lip borne by said common wall, so that the slideway exhibits an unseparated region in which it consists of a main portion and, from a point of separation onward, a separated region in which the main portion is split along a longitudinal cutting line to form the inner portion and the outer portion;
mounting the main portion on the doorframe up to the point where the point of separation comes into line with the post;
mounting the outer portion and the inner portion on the doorframe beyond said point of separation and along the post, respectively.

This makes it possible both to obtain acoustic sealing inside the vehicle in the upper region of the post while at the same time eliminating the esthetic drawback of the independent rubber component, which is present in the second scenario mentioned hereinabove.

Furthermore, longitudinally separating the slideway into two half-slideways consisting of the outer portion and the inner portion, means that the neutral axes are dissociated, which makes them easier to bend. In particular, the method advantageously involves differential bending of the outer portion and of the inner portion.

The post may be covered with a cover strip.

Furthermore, this method also lends itself to eliminating the esthetic problem at the top of the post, by virtue of the cover strip being articulated to the outer wall region.

The cover strip may also exhibit at least one sealing lip which comes to lie opposite the at least one said sealing lip borne by the common wall.

The invention also relates to a slideway for a vehicle door, exhibiting a region for mounting on a support such as a rebate and a sealing region comprising at least two opposed sealing lips, the mounting region and the sealing region exhibiting a common wall region which bears at least one sealing lip, and the sealing region exhibiting an outer wall region forming outer covering of the slideway, characterized in that it exhibits an unseparated region in which it consists of a main portion and, from a point of separation onward, a longitudinally separated region in which the main portion is split along a longitudinal cutting line into an outer portion which exhibits at least said outer wall region, and an inner portion which exhibits said mounting region and said sealing lip borne by said common wall.

The slideway may have an outer cover strip, preferably articulated to the outer wall region.

To supplement the sealing on the mobile-glass side, the cover strip may exhibit at least one sealing lip which, when the cover strip is parallel to the inner portion, comes to lie opposite one said sealing lip borne by the common wall.

The cover strip may, in cross section, be shaped as a barbed hook, allowing it to be snap-fastened into a complementary groove in the post.

To facilitate cutting and possibly to reinforce the outer half-slideway after cutting, when the slideway is reinforced, the slideway advantageously has a shoulder located near to the longitudinal cutting line.

Other features and advantages of the invention will become more apparent from reading the description which will follow, given by way of nonlimiting example, in conjunction with the appended drawings, in which:

FIG. 2 illustrates the fitting of the portions of the slideway according to the invention.

FIGS. 2A, 2B, 2C and 2D are cross-sectional views of the slideway taken along the lines A—A, B—B, C—C and D—D of FIG. 2, respectively.

FIG. 4 illustrates the subassembly combining a fixed glass and a post.

Figure 5A:
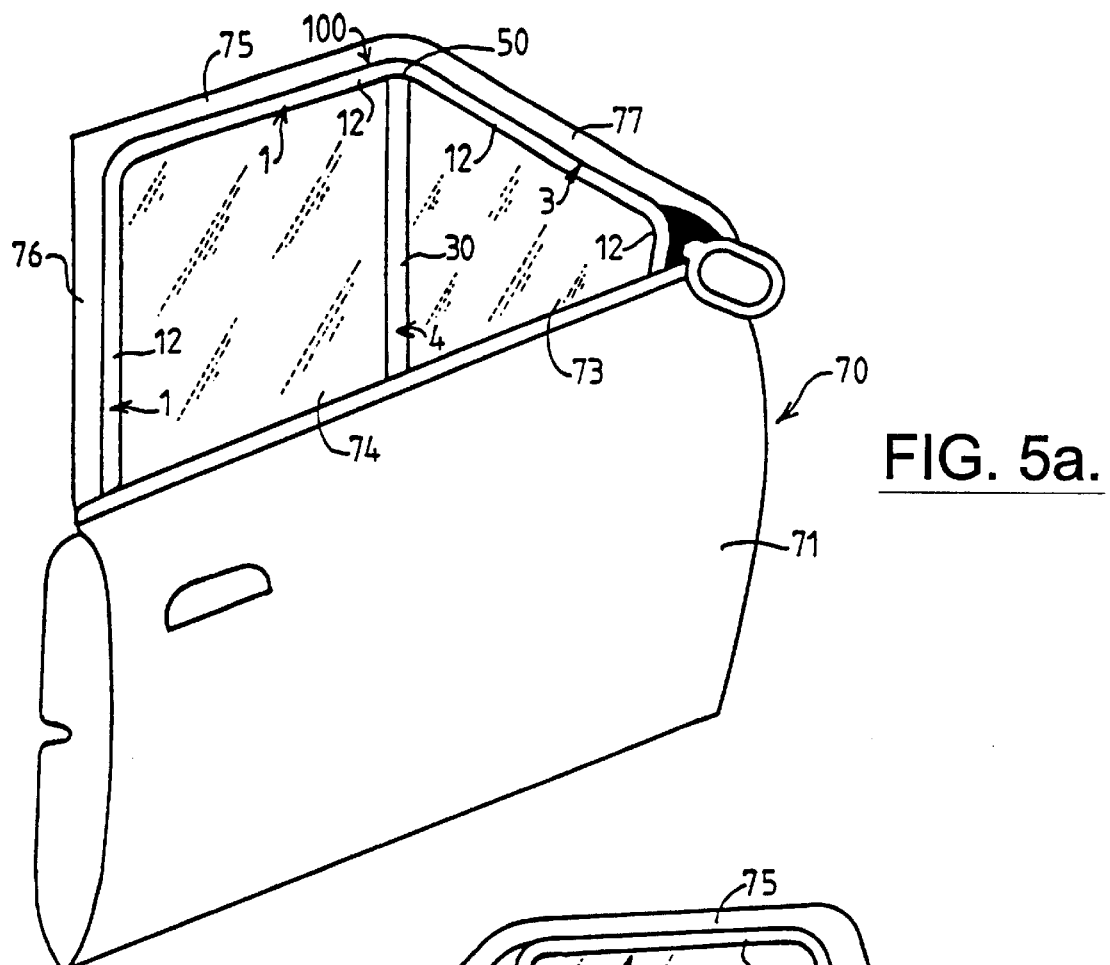
Figure 5B:
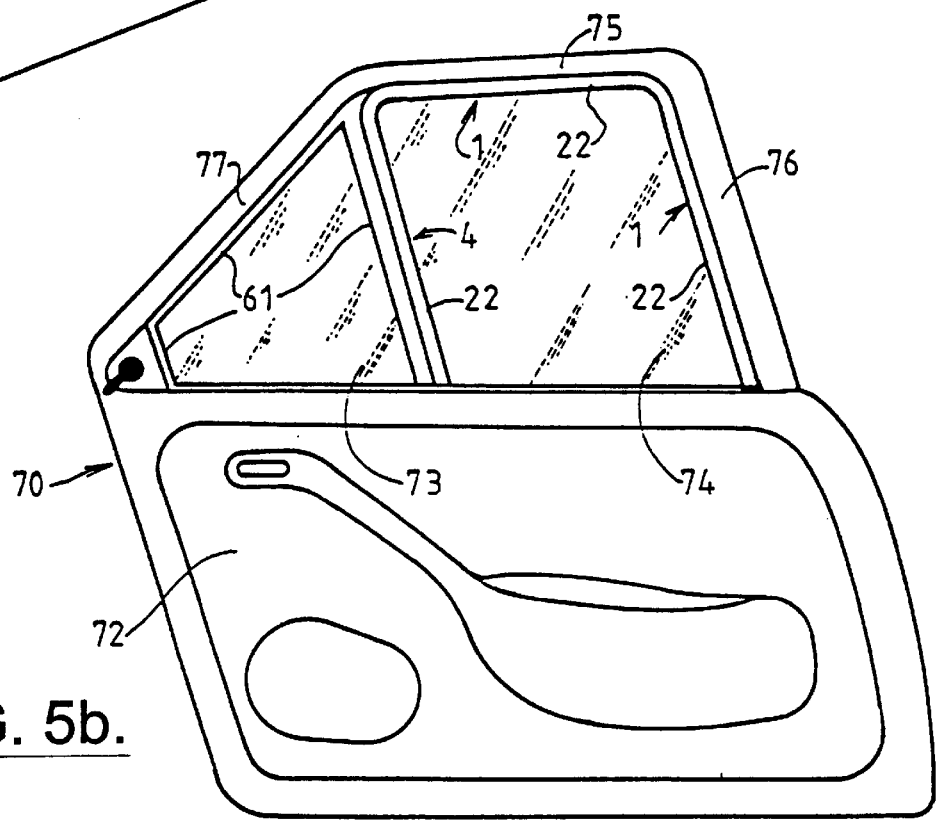

and FIGS. 5a and 5b show the appearance of the assembly once mounted, respectively from the inside and from the outside of the vehicle.

Figure 1:
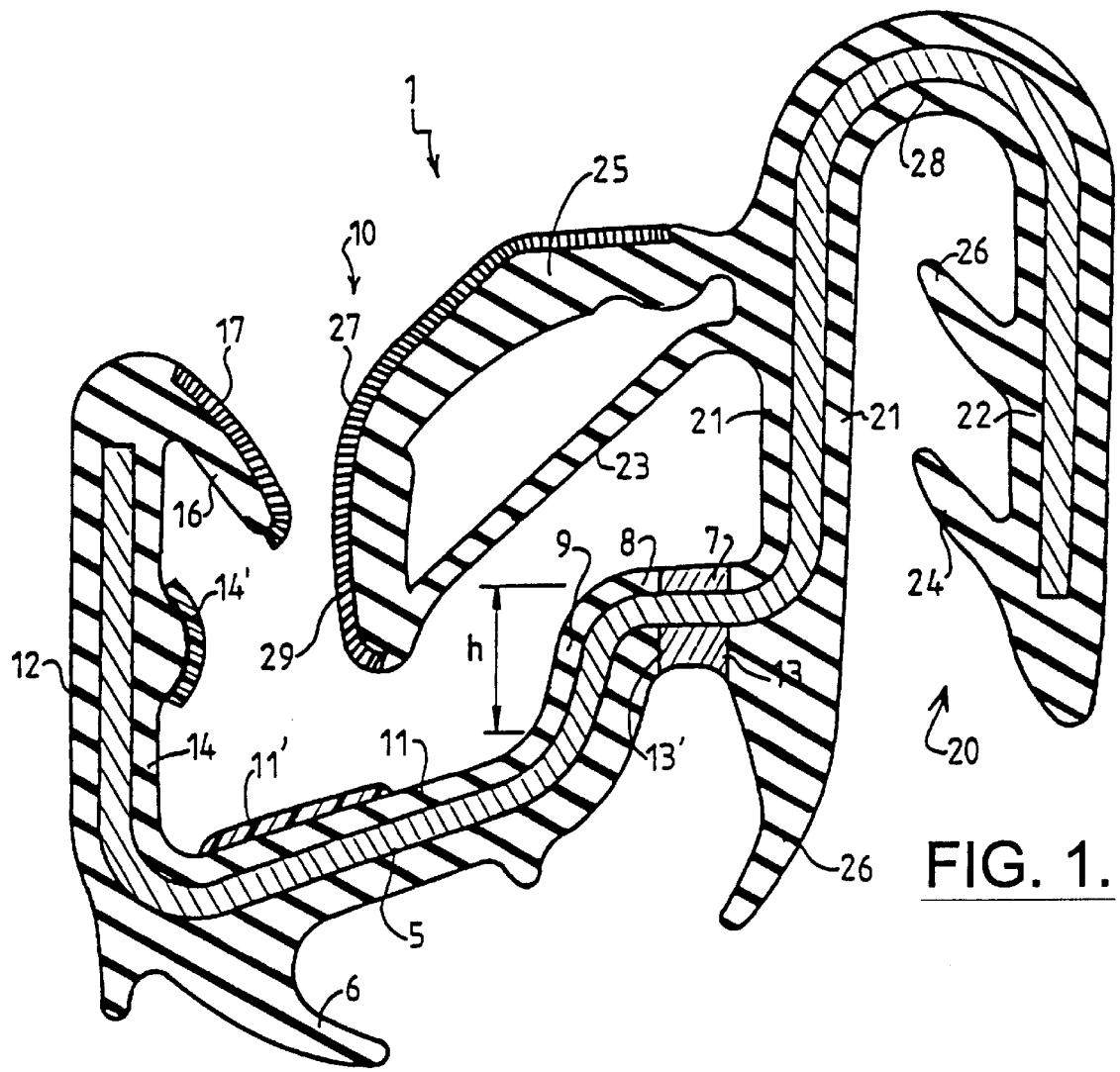
FIG. 1 depicts the profile of a slideway according to a preferred embodiment of the invention.

The extruded slideway made of EPTM or TPE depicted in FIG. 1, exhibits a region 20 for mounting on a support such as a rebate forming part of a motor vehicle doorframe, and a sealing region 10, both of which are generally U-shaped, the two U-shaped members being arranged in opposite orientations with one branch 21 in common.

The slideway as depicted exhibits a reinforcement 5, generally made of steel, stainless steel or aluminum, with a thickness of 0.8 mm for example and which, as depicted, affects the entire profile.

This reinforcement 5 could be arranged on just part of the profile, in this instance the region 20, or alternatively could be completely absent.

The region 20 comprises two parallel branches 21 and 22 connected by a central branch 28. Two flexible lips 24 and 26 are used in the conventional way to improve the anchorage of the slideway onto the rebate of the doorframe.

The region 10 comprises two parallel branches 14 and 21 which bear sealing lips 16 and 25 respectively, which face each other and are surface-coated with a material that has a low coefficient of friction, such as, for example, polyamide flock or crosslinked silicone lacquer, at 17 and 27, to allow a moving glass to slide and to improve the acoustic sealing. The main lip 25 preferably has a membrane 23 intended to prevent it from giving or folding in the area where, as will be seen later, the slideway is to be subjected to bending. Also of note are the sealing lips 6 and 26 borne by the outer face of the central branch 11 which connects the parallel branches 12 and 21, and the areas 11' and 14' on the inner face of the branches 11 and 14, which are coated with co-extruded crosslinked polyethylene.

The branch 14 has an outer cover edge 12, which is the externally visible face of the slideway once mounted on the vehicle.

To allow the cutting in the cutting zone 7, and ensure that the region 10 maintains good rigidity (in the case of a reinforced slideway) after cutting, the central branch 11 has a region 9 forming a step of height h which extends toward the branch 21 in the form of a flat 8 in which said cutting zone 7 is located.

The slideway is cut longitudinally over part of its length in the cutting zone 7 to leave:

a portion 1 which consists of an uncut length of slideway (section AA of FIG. 2), which extends as far as the point 100 of separation, where it splits into:

a portion 2 (inner half-slideway) which consists of the region 20 as far as the cutting line 13 (section BB of FIG. 2), a portion 3 (outer half-slideway) which consists of the region 10 as far as the cutting line 13' (section CC of FIG. 2), therefore including any step 9 which may be present.

The portion 1 is mounted on the doorframe (vertical 76 and horizontal 75 regions in FIGS. 5a and 5b), while the portion 3 (outer half-slideway) also runs along the quarter light region 77 of the doorframe, in the extension of the region 75.

The portion 2 (inner half-slideway) is bent and/or radiused through an angle of about 90° at the top of the post 40 (see FIG. 3) and drops down along this post. In the case of a reinforced slideway, the zone of the reinforcement 5 corresponding to the central branch 28 is preferably formed as a semicircle, as depicted.

Figure 3:
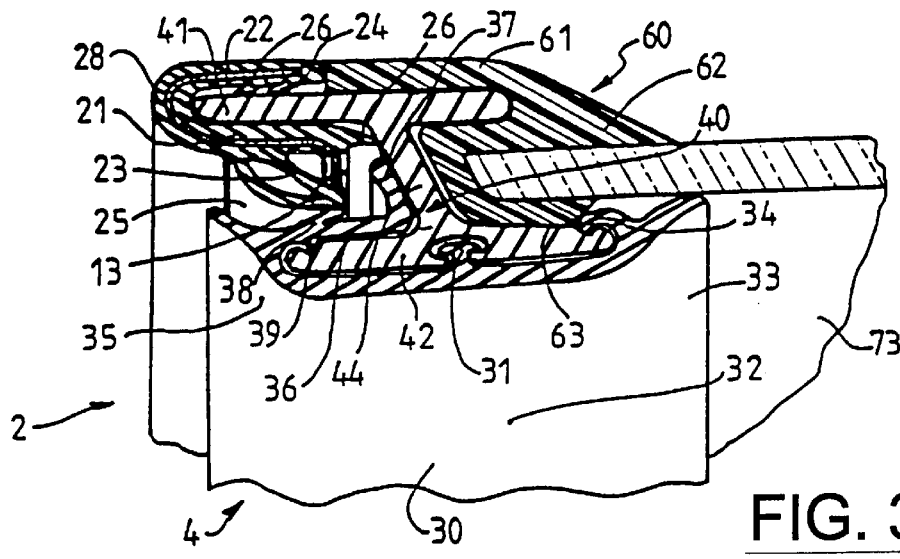
FIG. 3 is a perspective view with horizontal section illustrating the mounting on the post.

As shown more particularly in FIGS. 3 and 4, the post 40 is in the form of an H-shaped section with two parallel main branches 41 and 42 connected by a bridge 44.

The branch 42 is longitudinally grooved at 43 with a profile that complements that of a rib 31 in the shape of a small barbed hook which runs along a central region 32 of a cover strip 30 which is pressed against the branch 42, this pressing being achieved by the interaction of the barbed hook 31 and of the rib 43. This strip 30 provides the post 40 with its own covering on the outside of the vehicle.

The strip 30 has a lateral region 33 which snap-fastens in the direction of the quarter light glass 73, by virtue of a rib 34 which returns into a corresponding groove in the branch 42. On the opposite side, the strip 30 has another lateral region 34 which wraps around the other end of the branch 42 (see rib 39 and the corresponding groove in the interior face of the branch 42). The lateral region 34 is extended by two flat regions 36 and 37 at 90° from one another which run along the interior edge of the branch 42 and part of the bridge 44, until they come to face the lip 26 and the cutting line 13.

Also of note is the lip 38 which comes to face the main lip 25 to act as the lip 16 and re-establish the sealing of the moving glass 74.

The portion 2 is fitted as depicted around one of the ends of the main branch 41 in such a way that its branch 21 borders the inside of said end of the branch 41 and that the lip 26 bears against the bridge 44. The opposite end of the branch 22 from the central branch 28 bears against an outer branch 61 of an overmolding 60 (generally known as an encapsulation) which traps the quarter light glass 73 between its branches 62 and 63. The end of the branch 63 comes up close to the rib 34 of the cover strip 30.

The two half-slideways (portion 2 and portion 3) which, when reinforced, can be bent at different curvatures (differential bending) make it possible for different functions which, in theory appear contradictory, to be fulfilled.

The inner half-slideway (portion 2) is bent/radiused at an angle of about 90° at the top of the post 40 and runs down along this post: there is therefore good acoustic sealing on the inside of the vehicle, because there is continuity of the main bearing lip 25.

The outer half-slideway (portion 3) runs along the crimped doorframe (76, 75, 77). This allows continuity of the doorframe covering by the covering edge 12 (see FIG. 5a).

The strip 30 which constitutes the portion 4, is preferably molded at 50 to the outer half-slideway (portion 3) on the outer cover face 12, so as to improve the covering which is then achieved without discontinuity by the outer cover edge 12 and by the strip 30 (FIG. 5a).

On the inside, decorative covering is achieved by the esthetic and acoustic continuity of the branch 22 which internally covers the doorframe and the post around the periphery (76, 75, 40) of the moving glass.

It will also be noted that the separation into two half-slideways makes bending easier because the neutral axes of the two U-shaped members 10 and 20 are dissociated. Thus, it becomes possible to reduce the bend radius by comparison with the second scenario mentioned hereinabove.

The present invention is applicable to all scenarios of opening leaves, particularly for motor vehicles, in which there is a combination of a moving glass and a fixed glass.

The invention can be implemented in kit form, the kit comprising:

a slideway, advantageously pre-cut and pre-bent, as depicted in FIG. 2;

a quarter light comprising the post 40, the fixed glass 73 and the encapsulation 60 of the post 40 and of the glass 73 (FIG. 4 and details EE and FF).

What is claimed is:

1. A method for fitting a slideway to a door of a motor vehicle having a doorframe, as well as fixed glass and a moving glass which are separated by a fixed post, said slideway including a mounting region for a mounting on a support and a sealing region comprising at least two opposed sealing lips, the mounting region and the sealing region having a common wall region which bears at least one said sealing lip, and the sealing region having an outer wall region forming an outer covering of the slideway, said method comprising:

separating the slideway longitudinally, over part of its length, into an outer portion which has at least said outer wall region, and an inner portion which has at least said mounting region and said sealing lip borne by said common wall, so that the slideway has an unseparated region in which it consists of a main portion and, from a point of separation onward, a separate region in which the main portion is split along a longitudinal cutting line to form the inner portion and the outer portion;

mounting the main portion on the doorframe up to the point where the point of separation comes into line with the post; and mounting the outer portion and the inner portion on the doorframe beyond said point of separation and along the post, respectively.

2. The method as claimed in claim 1, wherein the slideway includes a reinforcement and wherein said method includes the step of differentially bending the outer portion and the inner portion.

3. Method according to either of claim 1, characterized in that the post is covered on the outside with a cover strip (4).

4. The method as claimed in claim 3, wherein said cover strip includes at least one scaling lip which is positioned opposite the at least one said sealing lip borne by the common wall of the inner portion.

5. Method according to claim 3, characterized in that said cover strip (4) is articulated (50) to said outer wall region (12).

6. A slideway for a vehicle door comprising an elongate body having a cross-sectional configuration defining a mounting region for mounting on a support and a sealing region comprising at least two opposed sealing lips, the mounting region and the sealing region including a common wall region which bears at least one sealing lip, and the scaling region including an outer wall region forming an outer covering of the slideway, and said elongate body having, along its longitudinal extent, an unseparated region, a point of separation, and, from the point of separation onward along the longitudinal extent, a longitudinally separated region in which the elongate body is split longitudinally into an outer portion which includes at least said outer wall region, and an inner portion which includes said mounting region and said sealing lip borne by said common wall.

7. The slideway as claimed in claim 6, which includes an outer cover strip articulated to the outer wall region.

8. The slideway as claimed in claim 7, wherein said cover strip has at least one sealing lip which, when the cover strip is parallel to the inner portion, is positioned opposite one said sealing lip borne by the common wall.

9. The slideway as claimed in claim 7, wherein the cover strip in cross section is shaped as a barbed hook, allowing it to be snap-fastened into a corresponding complementary groove in a post.

10. Slideway according to one of claims 6, characterized in that it comprises a reinforcement (5).

11. Slideway according to one of claims 6, characterized in that in cross section it has a shoulder (9) located near to the longitudinal cutting line (13, 13').

12. The slideway as claimed in claim 6, wherein said slideway is pre-bent to facilitate mounting.

13. An assembly for mounting a slideway on a motor vehicle door, which comprises a slideway as claimed in claim 6 and a quarter light comprising a post, a fixed glass and an encapsulation of the post and of the fixed glass.

* * * * *

UNITED STATES PATENT AND TRADEMARK OFFICE
CERTIFICATE OF CORRECTION

PATENT NO. : 6,250,017 B1
DATED : June 26, 2001
INVENTOR(S) : Tessier

Page 1 of 1

It is certified that error appears in the above-identified patent and that said Letters Patent is hereby corrected as shown below:

Column 2,
After line 60, insert, -- FIGS. 4A and 4B are cross-sectional views taken along the lines E-E and F-F of FIG. 4, respectively. --.

Signed and Sealed this

Eleventh Day of December, 2001

Attest:

NICHOLAS P. GODICI
*Attesting Officer*    *Acting Director of the United States Patent and Trademark Office*